(12) United States Patent
Muramoto

(10) Patent No.: US 10,382,653 B2
(45) Date of Patent: Aug. 13, 2019

(54) IMAGE PROCESSING APPARATUS

(71) Applicant: KYOCERA Document Solutions Inc., Osaka (JP)

(72) Inventor: Hideya Muramoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/552,488

(22) PCT Filed: Feb. 17, 2016

(86) PCT No.: PCT/JP2016/054510
§ 371 (c)(1),
(2) Date: Aug. 21, 2017

(87) PCT Pub. No.: WO2016/136541
PCT Pub. Date: Sep. 1, 2016

(65) Prior Publication Data
US 2018/0013923 A1    Jan. 11, 2018

(30) Foreign Application Priority Data
Feb. 27, 2015 (JP) .................................. 2015-037999

(51) Int. Cl.
| | |
|---|---|
| G06F 3/12 | (2006.01) |
| H04N 1/40 | (2006.01) |
| H04N 1/409 | (2006.01) |
| H04N 1/60 | (2006.01) |
| G06K 15/02 | (2006.01) |
| B41J 29/38 | (2006.01) |
| B41J 21/00 | (2006.01) |

(52) U.S. Cl.
CPC ............. *H04N 1/60* (2013.01); *B41J 29/38* (2013.01); *G06F 3/1219* (2013.01); *H04N 1/40* (2013.01); *H04N 1/4092* (2013.01); *B41J 21/00* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 5,020,119 | A * | 5/1991 | Tai ........................ | H04N 1/403 345/589 |
| 6,233,062 | B1 * | 5/2001 | Takamatsu ........... | H04N 1/3877 358/461 |
| 6,501,565 | B1 * | 12/2002 | Karidi ..................... | G06K 9/44 358/1.9 |
| 6,975,428 | B1 * | 12/2005 | Ernst .................. | G06K 15/1223 358/1.9 |

(Continued)

FOREIGN PATENT DOCUMENTS

JP        2008-219386        9/2008

*Primary Examiner* — Beniyam Menberu

(57) ABSTRACT

The character edge area determining unit (21) determines a character edge area in input image data.
The output image processing unit (12) performs an image process for a target pixel in the determined character edge area in order to adjust a toner consumption amount in accordance with the number of continuous edge pixels (i.e. continuous pixels that belong to the character edge area) included in a reference window of which a center is set on the target pixel and an average value of pixel values of the continuous edge pixels.

1 Claim, 5 Drawing Sheets

(56) References Cited

U.S. PATENT DOCUMENTS

| | | | | |
|---|---|---|---|---|
| 7,062,099 B2* | 6/2006 | Li | ............................ | G06K 9/38 |
| | | | | 358/521 |
| 2003/0031366 A1* | 2/2003 | Li | ............................ | G06K 9/38 |
| | | | | 382/206 |
| 2004/0114158 A1* | 6/2004 | Klassen | ................ | H04N 1/4092 |
| | | | | 358/1.9 |
| 2009/0213429 A1* | 8/2009 | Miyagi | ................. | H04N 1/4051 |
| | | | | 358/2.1 |
| 2016/0124688 A1* | 5/2016 | Nakamura | ............ | G06F 3/1219 |
| | | | | 399/27 |

* cited by examiner

BLACK CHARACTER

CHARACTER EDGE AREA

TARGET PIXEL

REFERENCE WINDOW

CHARACTER EDGE AREA

BLACK CHARACTER

CHARACTER EDGE AREA

TARGET PIXEL

REFERENCE WINDOW

CHARACTER EDGE AREA

GRAY CHARACTER

CHARACTER EDGE AREA

TARGET PIXEL

REFERENCE WINDOW

CHARACTER EDGE AREA

IMAGE PROCESSING APPARATUS

TECHNICAL FIELD

The present invention relates to an image processing apparatus.

BACKGROUND ART

Some image forming apparatuses such as printers or multi function peripherals are capable of performing a toner saving process.

As a toner saving process, an image forming apparatus performs a gamma correction for an achromatic color part (i.e. a K signal) in a text document, and does not perform toner saving for a high density part but performs toner saving for a low density part (for example, see Patent Literature #1).

CITATION LIST

Patent Literature

PATENT LITERATURE #1: Japanese Patent Application Publication No. 2008-219386.

SUMMARY OF INVENTION

Technical Problem

However, in case of the aforementioned image processing apparatus, there are problems that readability of a low-density character in a monochrome document is decreased due to the toner saving and a toner consumption amount is not reduced of a high-density character in a monochrome document.

The present invention has been made in view of the aforementioned problem. It is an object of the present invention to achieve an image processing apparatus that reduces a toner consumption amount with keeping readability of a character in a document.

Solution to Problem

An image processing apparatus according to an aspect of the present invention includes: a character edge area determining unit that determines a character edge area in input image data; and an output image processing unit that performs an image process for a target pixel in the determined character edge area in order to adjust a toner consumption amount in accordance with (a) the number of continuous pixels that belong to the character edge area included in a reference window of which a center is set on the target pixel and (b) an average value of pixel values of the continuous pixels.

Advantageous Effect of Invention

According to the present invention, a toner consumption amount is reduced with keeping readability of a character in a document.

DESCRIPTION OF EMBODIMENTS

Hereinafter, an embodiment of the present invention will be explained with reference to drawings.

Figure 1:
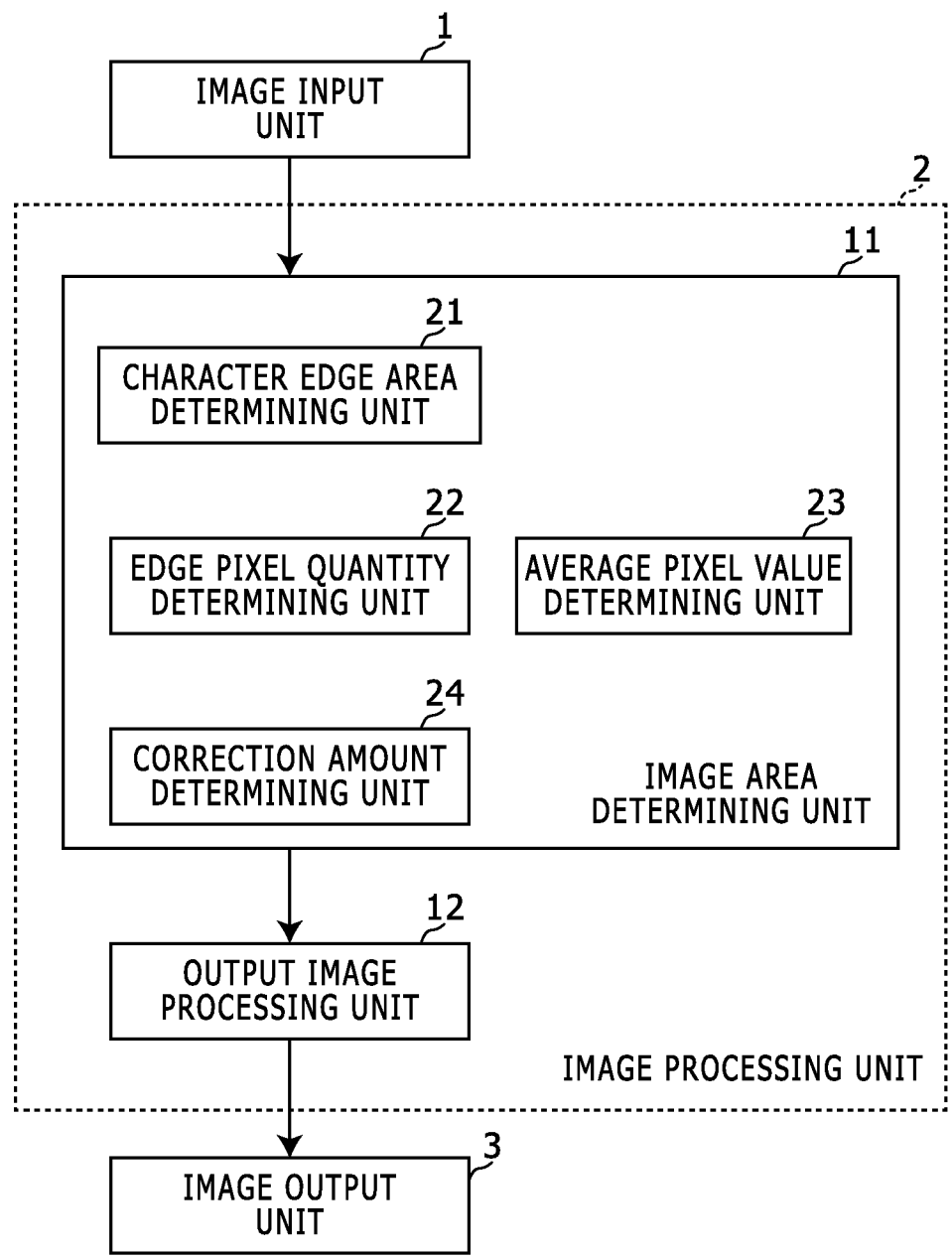
FIG. 1 shows a block diagram that indicates a configuration of an image processing apparatus according to an embodiment of the present invention.

FIG. 1 shows a block diagram that indicates a configuration of an image processing apparatus according to an embodiment of the present invention. The image processing apparatus shown in FIG. 1 is, for example, an image forming apparatus such as a printer or a multi function peripheral.

The image processing apparatus shown in FIG. 1 includes an image input unit 1, an image processing unit 2, and an image output unit 3. The image input unit 1 includes for example a scanner, and optically scans a document image, generates image data of the document image, and outputs the image data to the image processing unit 2. The image processing unit 2 performs sorts of image processing for the image data inputted from the image input unit 1, and outputs to the image output unit 3 the image data for which the image processing has been performed. The image output unit 3 includes for example a print engine, and prints on a printing paper sheet an image based on the image data provided from the image processing unit 2.

The image processing unit 2 includes an image area determining unit 11 and an output image processing unit 12.

The image area determining unit 11 performs an image area determination for each pixel in input image data. Specifically, the image area determining unit 11 determines an area property of each pixel in the input image data as a character area, a blank area, a non-blank area, and a half-toning-dot area. For example, the image area determining unit 11 extracts edges using a Laplacian filter or the like, performs a labeling process for the extracted edges, and thereby determines a character area.

Further, the image area determining unit 11 includes a character edge area determining unit 21, an edge pixel quantity determining unit 22, an average pixel value determining unit 23, and a correction amount determining unit 24.

The character edge area determining unit 21 determines a chromatic or achromatic character edge area in the character area on the basis of the input image data.

Specifically, on the basis of the input image data, the character edge area determining unit 21 detects a character edge in the character area, and determines as the character edge area a range on a high density side of the character edge, and the range corresponds to a density difference between the high density side and a low density side of the character edge. Therefore, a character of a higher density causes a wider character edge area of the character.

Further, the edge pixel quantity determining unit 22 determines the number of continuous pixels that belong to the character edge area (called continuous edge pixels, hereinafter) included in a reference window of which a center is set on a target pixel. The size of the reference window is set as, for example, 9 pixels by 9 pixels, 13 pixels by 13 pixels, or the like. The size of the reference window in a primary scanning direction and the size of the reference window in a secondary scanning direction may be different from each other.

To describe in detail, the continuous edge pixel is a pixel belonging to the character edge area among pixels included in the reference window, and is a pixel continuous to another pixel belonging to the character edge area in any of a vertical direction, a horizontal direction, and an oblique direction.

Further, the average pixel value determining unit 23 determines an average value of pixel values of continuous edge pixels included in the aforementioned reference window.

The correction amount determining unit 24 determines a correction amount on the basis of (a) the number of pixels determined by the edge pixel quantity determining unit 22 and (b) the average value determined by the average pixel value determining unit 23.

The correction amount determining unit 24 determines the larger correction amount for the larger number of the continuous pixels, and determines the larger correction amount for the larger average value.

Here, for example, the correction amount determining unit 24 determines as the correction amount a product of (a) the number of pixels determined by the edge pixel quantity determining unit 22 and (b) the average value determined by the average pixel value determining unit 23.

The output image processing unit 12 performs image processing required for printing based on the image data. For example, the output image processing unit 12 performs for a character area an edge emphasis process using a differentiation filter or the like, and a color correction process, a black generation/UCR (Under Color Removal) process, a half-toning process and the like suitable to the character area; and performs for a half-tone dot area or a background area a smoothing process using an integration filter or the like, and a color correction process, a black generation/UCR process, an intermediate gradation, a half-toning process and the like suitable to the half-tone dot area or the background area. Consequently, a character part in a print image is made clear, and moire and/or noise are restrained in a halftone dot area.

Further, the output image processing unit 12 performs the aforementioned image processing for the target pixel so as to adjust a toner consumption amount in accordance with (a) the number of pixels determined by the edge pixel quantity determining unit 22 and (b) the average value determined by the average pixel value determining unit 23.

Here the output image processing unit 12 adjusts intensity of this image processing in accordance with the aforementioned correction amount. The output image processing unit 12 performs this image processing so as to reduce a toner consumption amount of the target pixel more for the larger aforementioned correction amount. Specifically, after setting a value of a parameter in this image processing in accordance with the aforementioned correction amount, this image processing is performed.

For example, the output image processing unit 12 adjusts intensity of edge emphasis in accordance with the aforementioned correction amount. Specifically, the output image processing unit 12 reduces intensity of edge emphasis more for the larger aforementioned correction amount.

Further, the output image processing unit 12 performs a half-toning process according to the aforementioned correction amount. In such a case, the output image processing unit 12 sets a dot size or a dot density of half toning dots after the half toning process as smaller for the larger aforementioned correction amount.

Figure 2:
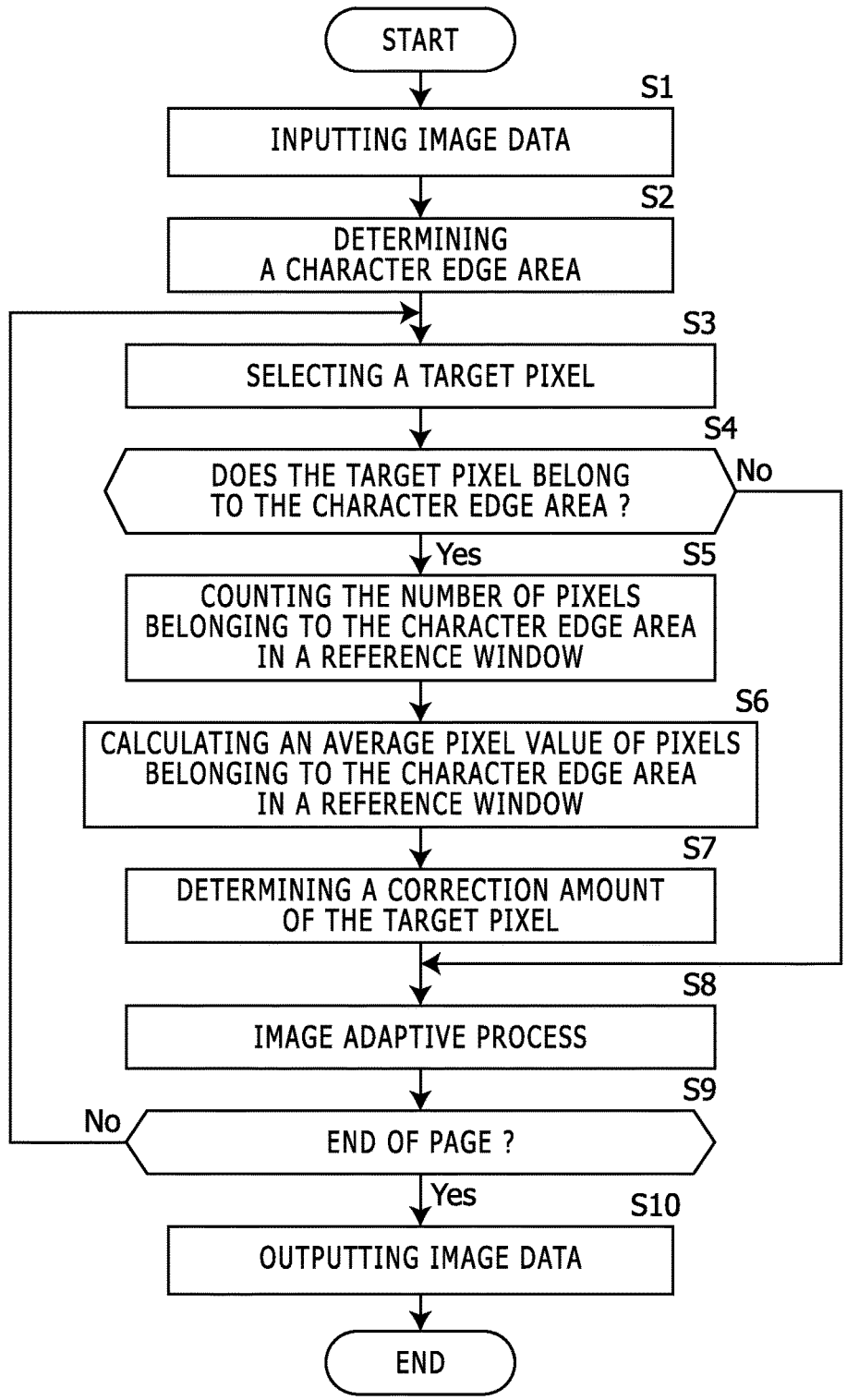
FIG. 2 shows a flowchart that explains a behavior of the image processing apparatus shown in FIG. 1.

The following part explains a behavior of the aforementioned image processing apparatus. FIG. 2 shows a flowchart that explains a behavior of the image processing apparatus shown in FIG. 1.

Firstly, the image input unit 1 generates bitmap data of a document image scanned by an image scanner, and stores it in an unshown memory (in Step S1). In the image area determining unit 11, the character edge area determining unit 21 determines a character edge area in this page (in Step S2).

Subsequently, the image processing unit 2 repeatedly selects a target pixel along a predetermined scanning order in each page page by page for the image data (in Step S3).

Subsequently, the image area determining unit 11 determines whether the target pixel belongs to the character edge area or not (in Step S4).

If the target pixel belongs to the character edge area, then the image area determining unit 11 determines continuous edge pixels included in a reference window of which a center is set on the target pixel, the edge pixel quantity determining unit 22 counts the number of the determined continuous edge pixels (in Step S5), and the average pixel value determining unit 23 determines an average value of pixel values of the determined continuous edge pixels (in Step S6).

Subsequently, the correction amount determining unit 24 determines a correction amount of the target pixel from the number of the determined continuous edge pixels and the average value of pixel values of the determined continuous edge pixels (in Step S7).

If the target pixel does not belong to the character edge area, then the correction amount of the target pixel is set as a default value.

Afterward, the output image processing unit 12 performs the aforementioned image adaptive process (a spatial filter process, a color correction process, a black generation/UCR process, an intermediate gradation process and the like) to which the determined correction amount is applied for the target pixel (in Step S8). Therefore, a toner consumption amount is adjusted in accordance with the correction amount determined for the target pixel.

Here specific examples are explained.

Figure 3A:
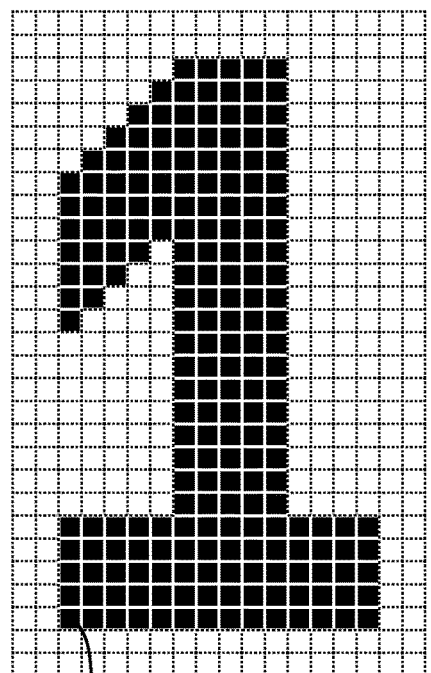
FIG. 3A shows a diagram that indicates an example of a high-density thick character.
Figure 3B:
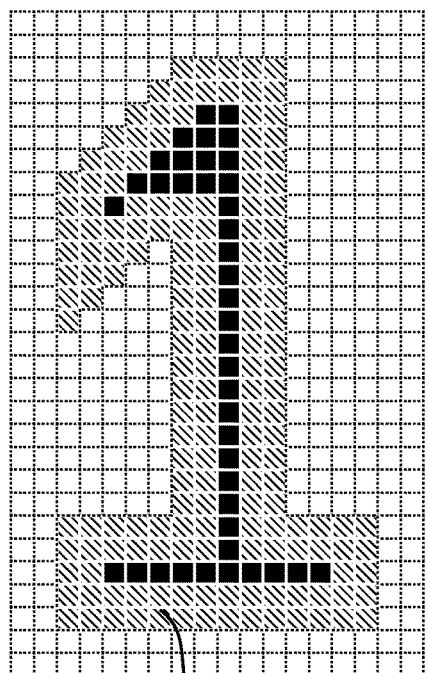
FIG. 3B shows a diagram that indicates an example of a character edge area of a high-density thick character.
Figure 3C:
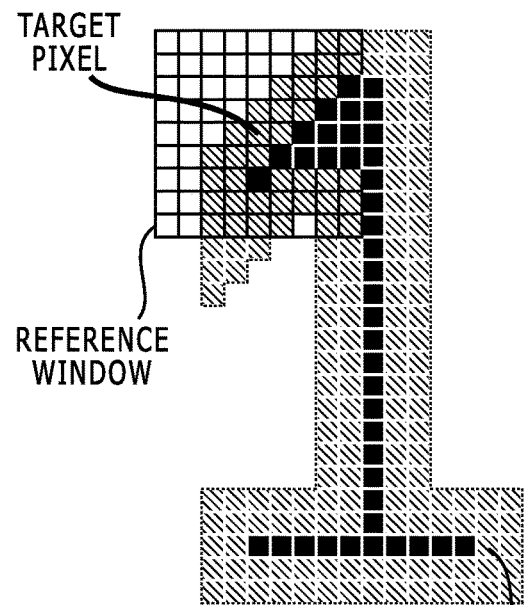
FIG. 3C shows a diagram that indicates an example of continuous edge pixels of a high-density thick character.

FIG. 3A shows a diagram that indicates an example of a high-density thick character; FIG. 3B shows a diagram that indicates an example of a character edge area of a high-density thick character; and FIG. 3C shows a diagram that indicates an example of continuous edge pixels of a high-density thick character.

Figure 4A:
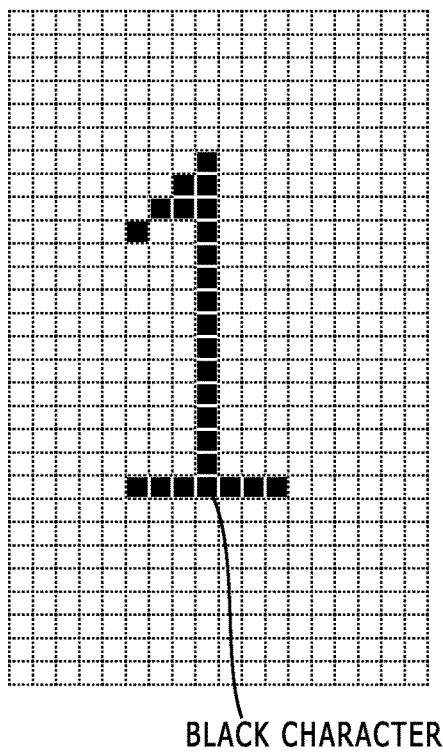
FIG. 4A shows a diagram that indicates an example of a high-density thin character.
Figure 4B:
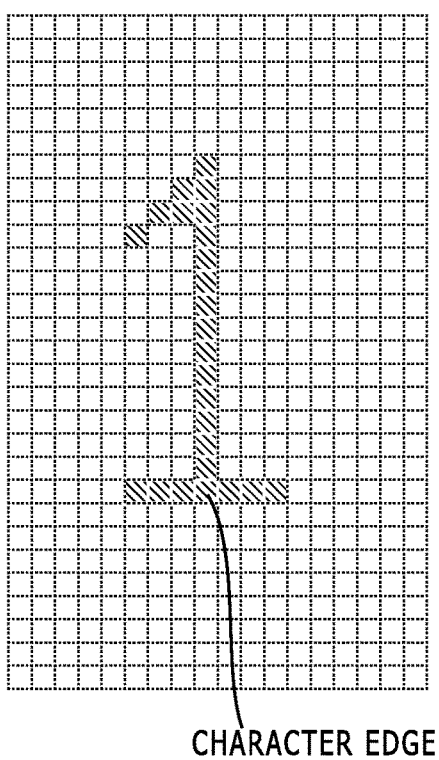
FIG. 4B shows a diagram that indicates an example of a character edge area of a high-density thin character.
Figure 4C:
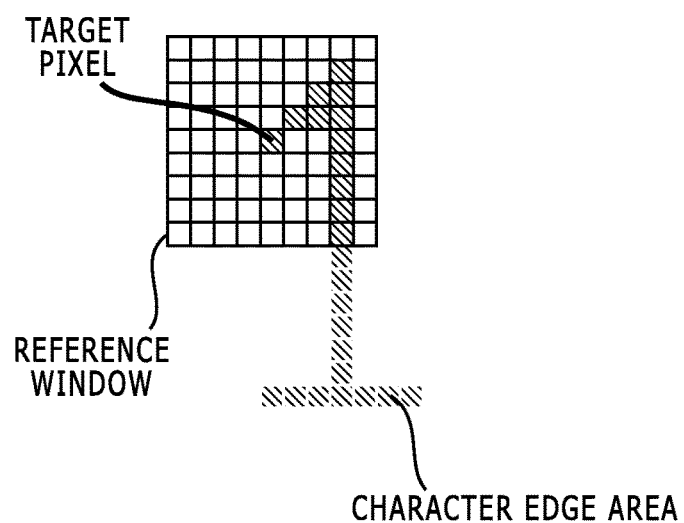
FIG. 4C shows a diagram that indicates an example of continuous edge pixels of a high-density thin character.

FIG. 4A shows a diagram that indicates an example of a high-density thin character; FIG. 4B shows a diagram that indicates an example of a character edge area of a high-density thin character; and FIG. 4C shows a diagram that indicates an example of continuous edge pixels of a high-density thin character.

Figure 5A:
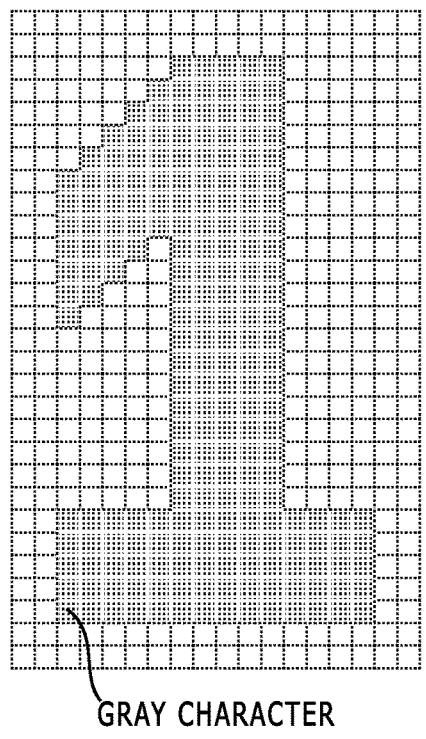
FIG. 5A shows a diagram that indicates an example of a low-density thick character.
Figure 5B:
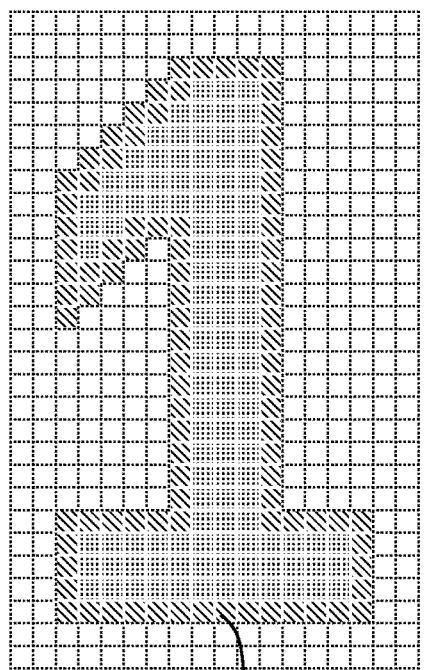
FIG. 5B shows a diagram that indicates an example of a character edge area of a low-density thick character.
Figure 5C:
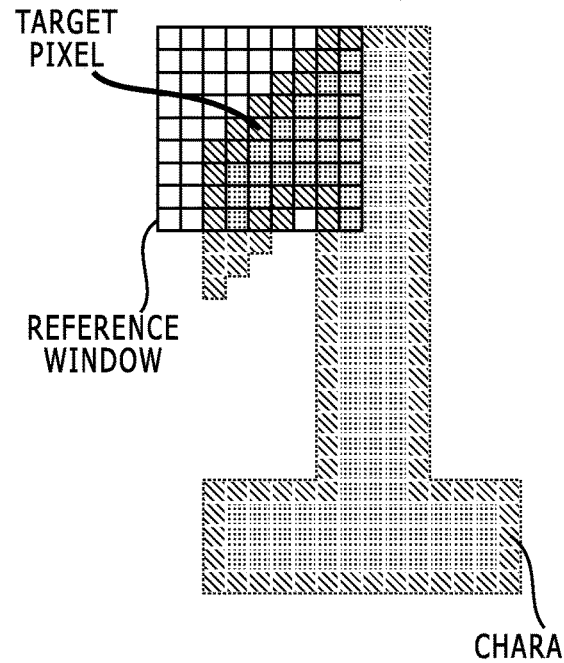
FIG. 5C shows a diagram that indicates an example of continuous edge pixels of a low-density thick character.

FIG. 5A shows a diagram that indicates an example of a low-density thick character; FIG. 5B shows a diagram that indicates an example of a character edge area of a low-density thick character; and FIG. 5C shows a diagram that indicates an example of continuous edge pixels of a low-density thick character.

In a case of a character (a character with a pixel value of 230) shown in FIG. 3A, the contrast (a difference between its high density side and its low density side) of the character edge is high, and therefore its character edge area of 2-pixel width is determined as shown in FIG. 3B. Further, for example, in a case of a target pixel shown in FIG. 3C, the number of continuous edge pixels is 36, and the average value of the continuous edge pixels is 230. When normalized by the number of all pixels in the reference window (here 81), the number of the continuous edge pixels is 0.44 (=36/81), and when normalized by the maximum value of pixel values of the continuous edge pixels (here, 255), the average value of the continuous edge pixels is 0.90 (=230/255). Consequently, the correction amount of this target pixel is 0.40 (=0.44×0.90).

In a case of a character (a character with a pixel value of 230) shown in FIG. 4A, the contrast of the character edge is high but this character is a thin character with 1-pixel width, and therefore its character edge area of 1-pixel width is determined as shown in FIG. 4B. Further, for example, in a case of a target pixel shown in FIG. 4C, the number of continuous edge pixels is 12, and the average value of the continuous edge pixels is 230. When normalized by the number of all pixels in the reference window, the number of the continuous edge pixels is 0.15 (=12/81), and when normalized by the maximum value of pixel values of the continuous edge pixels, the average value of the continuous edge pixels is 0.90 (=230/255). Consequently, the correction amount of this target pixel is 0.14 (=0.15×0.90).

In a case of a character (a character with a pixel value of 120) shown in FIG. 5A, the contrast of the character edge is low, and therefore its character edge area of 1-pixel width is determined as shown in FIG. 5B. Further, for example, in a case of a target pixel shown in FIG. 5C, the number of continuous edge pixels is 21, and the average value of the continuous edge pixels is 120. When normalized by the number of all pixels in the reference window, the number of the continuous edge pixels is 0.26 (=21/81), and when normalized by the maximum value of pixel values of the continuous edge pixels, the average value of the continuous edge pixels is 0.47 (=120/255). Consequently, the correction amount of this target pixel is 0.12 (=0.26×0.47).

As mentioned, the correction amount is small of a thin character or a low-density character, and consequently the image process is performed so as to make the toner consumption amount small. Consequently, occurrence of a line break in a thin character is restrained, and in addition, occurrence of dot vanishing in a low-density character is restrained, and therefore, it is restrained to decrease readability of such characters due to the toner cutback.

When finishing the aforementioned processes (in Steps S3 to S8) of the target pixel, the image processing unit 2 determines whether the target pixel reaches the end of the page or not (in Step S9), if the target pixel does not reach the end of the page, returns to Step S3, selects a next target pixel and performs the aforementioned processes (in Steps S3 to S8) for this target pixel.

Otherwise, if the target pixel reaches the end of the page, the image processing unit 2 terminates the image process for this page, and causes the image output unit 3 to perform printing of this page (in Step S10).

As mentioned, in the aforementioned embodiment, the character edge area determining unit 21 determines a character edge area in input image data. The output image processing unit 12 performs an image process for a target pixel in the determined character edge area in order to adjust a toner consumption amount in accordance with (a) the number of continuous edge pixels (i.e. continuous pixels that belong to the character edge area) included in a reference window of which a center is set on the target pixel and (b) an average value of pixel values of the continuous edge pixels.

Consequently, a toner consumption amount per pixel in a thin character or a low-density character is smaller than other characters, and therefore the toner consumption amount is small with keeping readability of a character in a document.

Further, for example, the aforementioned correction amount is determined for each pixel even in a case of a character that includes both of a thin-line part and a thick-line part, such as Mincho (Ming-style typeface) or Serif typeface, and therefore, readability of the thin-line part is not spoiled and toner in the thick-line part is reduced relatively much, and consequently, the toner consumption amount is small with keeping readability.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

In the aforementioned embodiment, the width of the character edge area is variable depending on a density difference between a high density side and a low density side of a character edge. Alternatively, the width may be constant regardless of a density difference between a high density side and a low density side of a character edge.

INDUSTRIAL APPLICABILITY

For example, the present invention can be applied to an image processing apparatus such as a digital multi function peripheral or an image scanner.

The invention claimed is:
1. A method of processing image data of an image to be printed on an image processing apparatus comprising the steps of:
(a) determining a character edge area in input image data;
(b) performing an image process for a target pixel in order to adjust a toner consumption amount in accordance with (1) a number of continuous pixels that belong to the character edge area included in a reference window of which a center is set on the target pixel and (2) an average value of pixel values of the continuous pixels;
(c) determining a correction amount, if the target pixel is in the determined character edge area, corresponding to (1) the number of the continuous pixels and (2) the average value of pixel values of the continuous pixels,
(d) determining the larger correction amount for the larger number of the continuous pixels and
(e) determining the larger correction amount for the larger average value;
(f) determining the correction amount to be a default value if the target pixel is not in the determined character edge area;

and (g) adjusting the intensity of the image process in accordance with the correction amount.

* * * * *